Oct. 7, 1969   J. D. STEWART   3,471,067
SHIRT PRESSING MACHINE
Filed Jan. 31, 1967   11 Sheets-Sheet 1

FIG. 1

INVENTOR.
JACK D. STEWART

BY George H. Fritzinger
AGENT

Oct. 7, 1969  J. D. STEWART  3,471,067
SHIRT PRESSING MACHINE
Filed Jan. 31, 1967  11 Sheets-Sheet 2

INVENTOR
JACK D. STEWART
BY George H. Fritzinger
AGENT

Oct. 7, 1969  J. D. STEWART  3,471,067
SHIRT PRESSING MACHINE
Filed Jan. 31, 1967  11 Sheets-Sheet 4

INVENTOR
JACK D. STEWART
BY George H. Fritzinger
AGENT

Oct. 7, 1969     J. D. STEWART     3,471,067
SHIRT PRESSING MACHINE
Filed Jan. 31, 1967     11 Sheets-Sheet 5

INVENTOR
JACK D. STEWART
BY George H. Fritzinger
AGENT

Oct. 7, 1969  J. D. STEWART  3,471,067
SHIRT PRESSING MACHINE
Filed Jan. 31, 1967  11 Sheets-Sheet

INVENTOR
JACK D. STEWART
BY George H. Fritzinger
AGENT

Oct. 7, 1969　　　J. D. STEWART　　　3,471,067
SHIRT PRESSING MACHINE
Filed Jan. 31, 1967　　　11 Sheets-Sheet 8

INVENTOR
JACK D. STEWART
BY George H. Fritzinger
AGENT

Oct. 7, 1969　　　　　J. D. STEWART　　　　　3,471,067
SHIRT PRESSING MACHINE
Filed Jan. 31, 1967　　　　　　　　　　　11 Sheets-Sheet 9

INVENTOR
JACK D. STEWART
BY George H. Fritzinger
AGENT

Oct. 7, 1969     J. D. STEWART     3,471,067
SHIRT PRESSING MACHINE

FIG. 26

INVENTOR
JACK D. STEWART
BY George H. Fritzinger
AGENT

United States Patent Office 3,471,067
Patented Oct. 7, 1969

3,471,067
SHIRT PRESSING MACHINE
Jack D. Stewart, Webster, N.Y., assignor to McGraw-Edison Company, Elgin, Ill., a corporation of Delaware
Filed Jan. 31, 1967, Ser. No. 618,251
Int. Cl. D06c 15/00
U.S. Cl. 223—57                                    15 Claims

ABSTRACT OF THE DISCLOSURE

A shirt pressing machine is provided of the type comprising two bucks which are moved alternately between dressing and pressing stations and which includes a shoulder ironer at the dressing station and a pair of pressing chests at the pressing station. The bucks are mounted on respective parallel rails and have side arms engaging respective curved guide rails which tilt the bucks to allow them to pass each other midway between the stations. The bucks are driven by a single air cylinder extending the length of travel of the bucks between the two stations. Each buck has sleeve extender arms, side wings and a tail clamp controlled by air cylinders within the buck. The pressing chests are moved by respective air cylinders into and out of engagement with the buck at the pressing station. All of the air cylinders are operated in a predetermined timed relationship.

---

Objects and features of the invention reside in
(1) A new carriage mechanism for the bucks by which the bucks are swung sideways to by-pass each other as they are moved between the dressing and pressing stations;
(2) A new air cylinder drive mechanism in combination with the buck carriage mechanism for driving the bucks alternately between the two stations;
(3) A novel pneumatic control system for the air cylinder drive mechanism which slows down the speed of the bucks automatically as they approach the end station;
(4) An interlock mechanism which prevents the bucks from being moved out of the end stations unless both the shoulder ironer and the pressing chests are in open positions;
(5) Improved pneumatic mechanism within the bucks for controlling a tail clamp, side winds and sleeve extenders;
(6) Spring-pressed air snubbers which are engaged by the bucks as they enter the dressing and pressing stations for supplying air pressure to operate the pneumatic control mechanisms within the bucks;
(7) A large low pressure air snubber for engaging a buck under spring pressure as it enters the pressing station to supply hot air through the buck and out the sides thereof whereby to puff out the sleeves while the shirt is pressed and to dry the padding to insure a dry shirt when it is removed from the buck;
(8) Latch mechanisms for holding the bucks in the respective stations against the spring pressure of the air snubbers until a control member is operated to release the latch mechanism and start the buck-driving mechanism;
(9) A sensing device which responds to initial movement of the bucks by the spring-pressed snubbers when the bucks are unlatched to start the drive mechanism in the right direction;
(10) A solenoid valve triggered by movement of a buck to a latched position at the dressing station for supplying air pressure via the aforementioned air snubbers to open the tail clamp, retract the side wings and retract the sleeve extenders;
(11) A control means operable after a shirt is dressed on the buck at the dressing station to allow the tail clamp to close and the side wings to expand under spring pressure and to move out the sleeve extenders;
(12) A solenoid valve triggered by movement of a buck into latched position at the pressing station for starting the chest closing mechanism;
(13) A novel chest mounting which causes the chests to open and close relative to the buck at the pressing station in a first range with a parallel movement and then through a greater range with a swinging movement; and
(14) A novel toggle-eccentric mechanism for closing the chests through the swing-movement range by a toggle mechanism and then by an eccentric mechanism while the chests are in their parallel movement range.

These and other objects and features of the invention will be apparent from the following description and the appended claims.

In the description of my invention reference is had to the accompanying drawings, of which.

Figure 1:
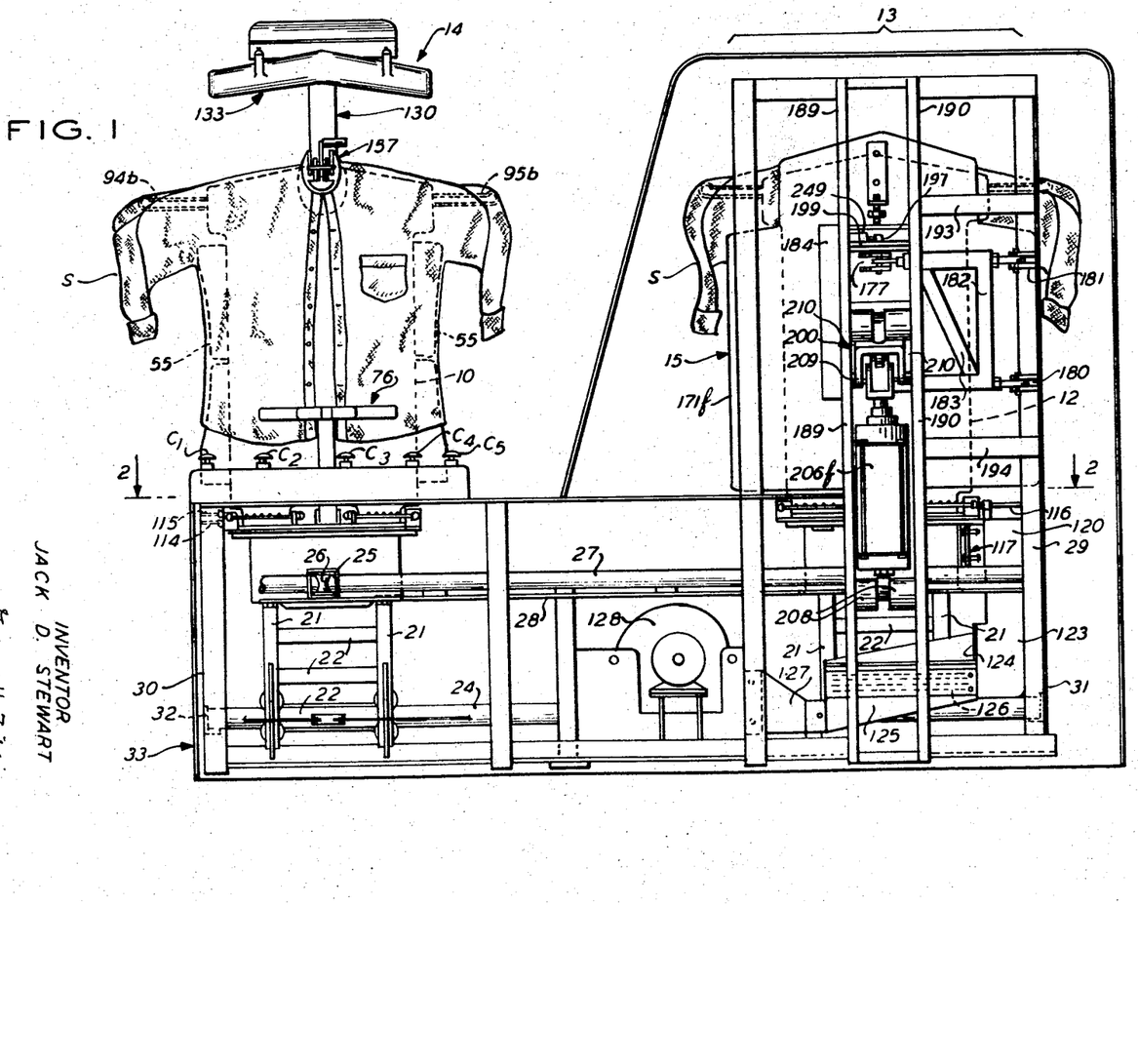
FIGURE 1 is a front elevation of a two-buck shirt pressing machine according to the invention, showing the two bucks respectively at the loading and pressing stations.
Figures 2, 3, 4:
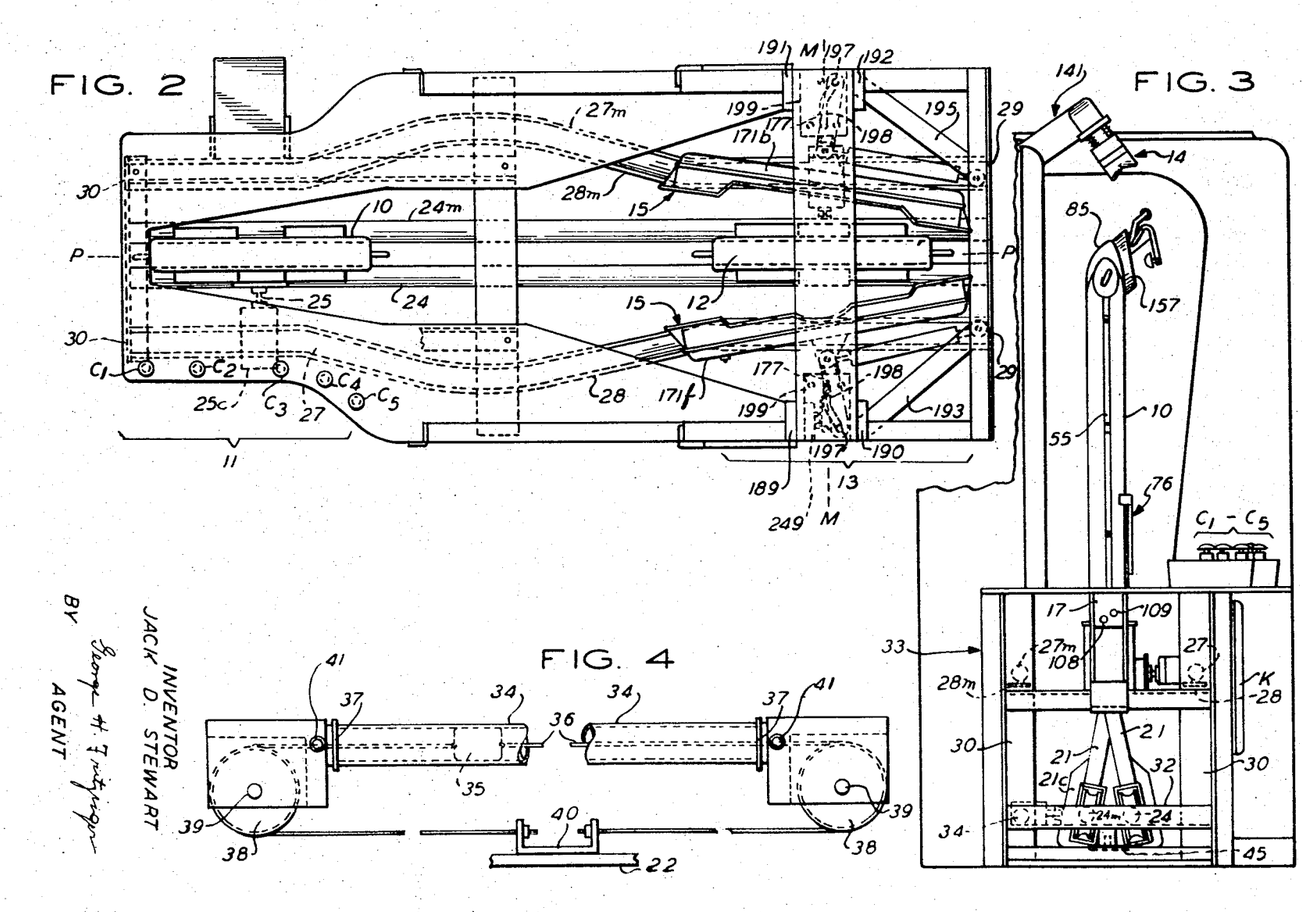
FIGURE 2 is a horizontal sectional view taken on the line 2—2 of FIGURE 1.
FIGURE 3 is a left hand elevational view of the machine shown in FIGURE 1.
FIGURE 4 is a fractional plan view of the air cylinder drive mechanism for the master buck—i.e., the buck mounted at the back side of the machine.
Figure 5:
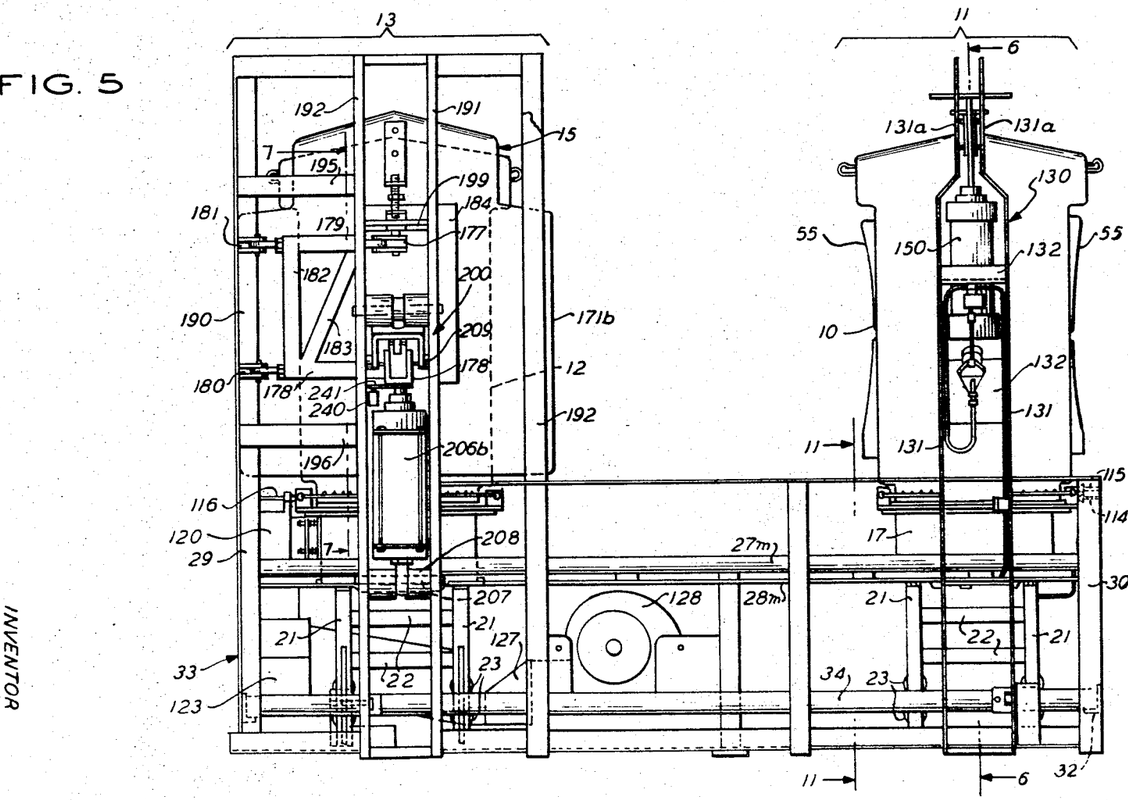
FIGURE 5 is a rear elevational view of the shirt pressing machine.
Figures 10, 11, 16, 25:
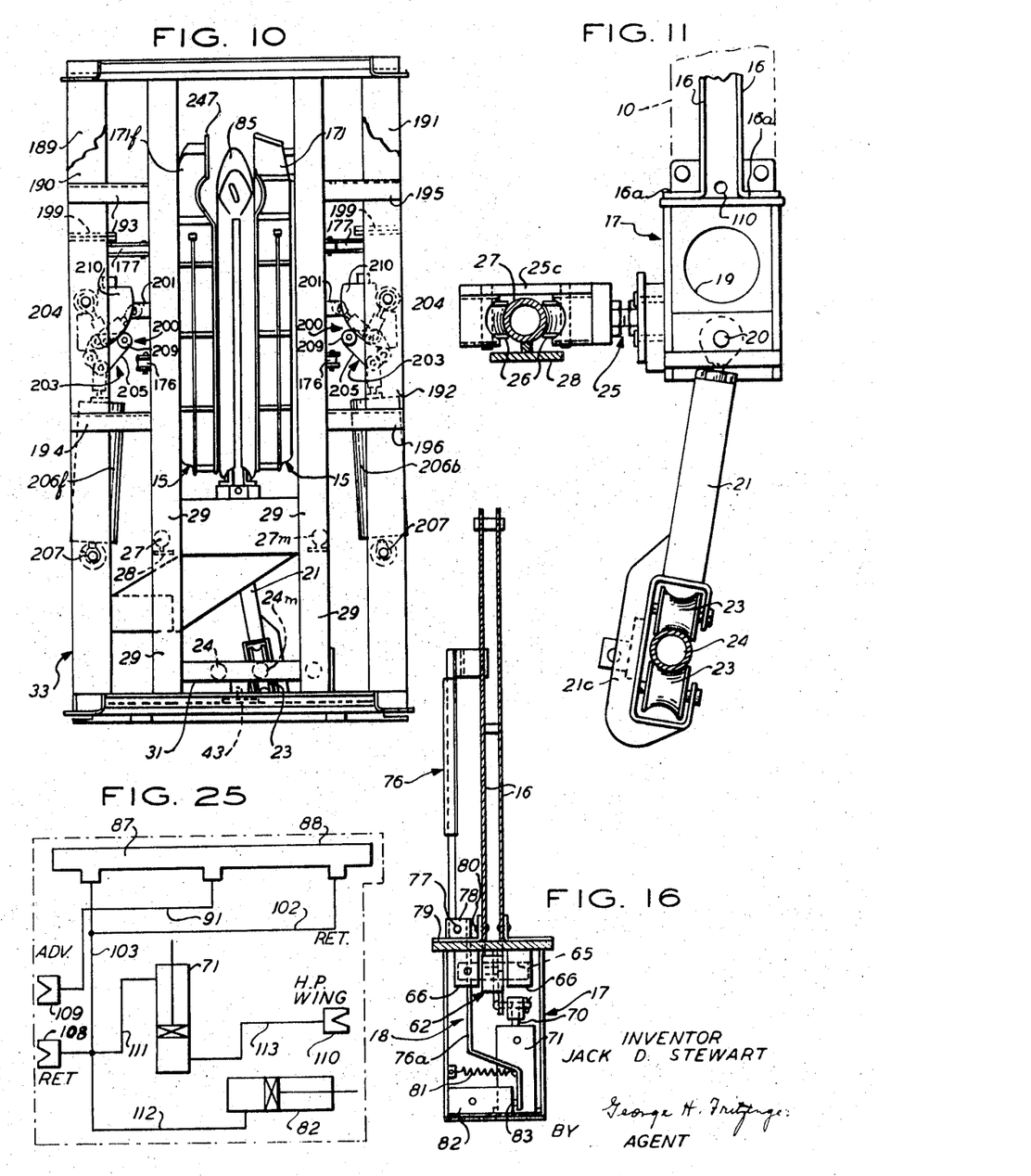
FIGURE 10 is a right end elevational view of the pressing machine.
FIGURE 11 is a vertical sectional view of the carriage for the buck at the dressing station taken on the line 11—11 of FIGURE 5.
FIGURE 16 is a right end elevational view fractionally showing the internal structure of the buck taken on the line 16—16 of FIGURE 14.
FIGURE 25 is a schematic of the pneumatic system in each of the bucks.

In the drawings a first buck 10 is shown at a dressing station 11 and a second identical buck 12 is shown at the pressing station 13 (FIGURES 1, 2 and 5). The buck 12 is herein referred to as the master buck since it is connected directly to the buck driving mechanism as is later described, and the buck 10 is called the slave buck since it is driven from the master buck. At the dressing station 11 there is a shoulder pressing yoke 14 shown in a raised or unoperated position, and at the pressing station 13 there is a pair of pressing chests 15 shown in open or unoperated positions (FIGURE 10). This is the condition of the machine when a pressed shirt is removed from the buck 10 at the dressing station and another shirt S is dressed thereon to be pressed.

Figure 13:
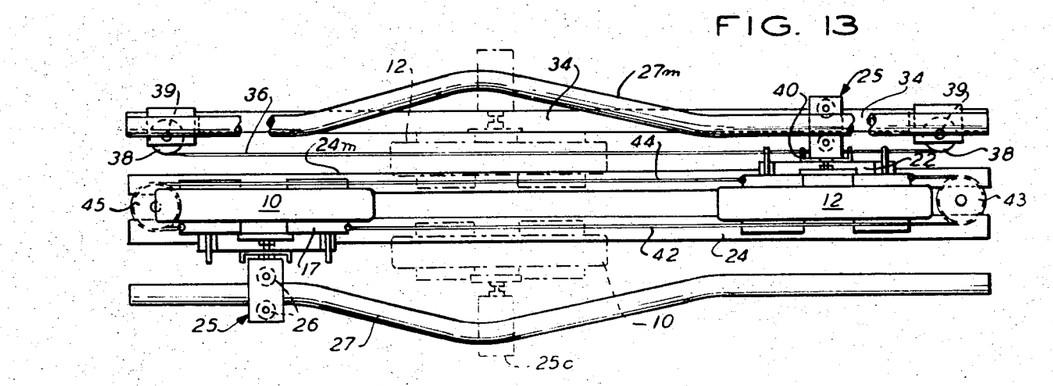
FIGURE 13 is a fractional view similar to FIGURE 2 showing the buck driving mechanism.

Each of the bucks 10 and 12 includes a pair of upstanding front and back buck frame plates 16. Each frame plate has a pair of left and right outwardly extending flanges 16a at the bottom secured to a lower buck housing structure 17. The lower buck housing structure is of a hollow construction (FIGURES 11 and 16) which houses a buck insert mechanism 18 and which has a large inlet opening 19 in the right wall by way of which hot air is fed into the buck when it is at the pressing station. Hinged at 20 to the lower part of the buck housing 17 are two depending carriage arms 21 secured rigidly together by three transverse tie bars 22 (FIGURE 1). The carriage arms terminate at their lower ends in C-shaped structures 21c (FIGURE 11) in each of which is journaled a pair of grooved rollers 23 that ride respectively on the top and bottom of a straight tubular carriage support rail 24 extending lengthwise of the machine at the bottom thereof. As will appear, there is a second parallel carriage support rail 24m at the back of the machine for the master buck. Extending inwardly of the machine from the lower buck housing structure is a control arm 25 terminating in a C-shaped structure 25c in which is journaled a pair of grooved rollers 26 that embrace the outer and inner sides of a tubular guide rail 27 located at a level typically about fifteen inches above the respective carriage rail. This guide rail and an indentical guide rail 27m for the master buck 12 are mounted at the same level and are each bowed outwardly from the center of the machine throughout their central portions (FIGURE 13) so as to swing the bucks apart to by-pass each other at a suitable clearance distance as the bucks are moved alternately between the pressing and dressing stations. However, the end portions of the guide rail are positioned to locate each buck at the longitudinal medial plane P of the machine when the buck reaches its end position.

Each guide rail is welded to a support bar 28 which in cross section has the shape of an inverted T (FIGURE 11) so as to rigidify the guide rail and provide clearance for the guide rollers. The guide rails 27 and 27m are secured at their right ends to vertical angle bars 29 and at their left ends to vertical angle bars 30. The carriage rails are secured at their right ends to transverse angle bars 31 and at their left ends to transverse angle bars 32. All of these angle bars are part of an integral welded frame structure 33 hereinafter more fully described.

The master buck 12 at the pressing station is coupled to a long air cylinder 34 (FIGURE 4). This air cylinder is located at the bottom of the machine in parallel relation to the carriage rails 24, and has an operating length at least as great as the distance of travel of the respective bucks between the two stations. Within the cylinder 34 is a piston 35 connected at each end to a plastic clad cable 36 cylindrical in cross section. The cable passes slidably through an air tight seal in an apertured wall 37 at each end of the cylinder. At each end of the drive cylinder there is a grooved roller 38 journaled at 39 to the frame structure. The cable is trained around each grooved roller and connected at its ends to a U-bracket 40 connected to the lowermost transverse tie bar 22 of the carriage for the master buck 12. Air is led under pressure into the opposite ends of the drive cylinder 34 through nozzles 41. So long as the air pressure at each end of the cylinder is the same the piston 35 remains at standstill, but when the air pressure is relieved at one end through suitable exhaust means hereinafter described the piston is propelled toward that end to drive the master buck in the opposite direction.

The slave buck at the dressing station is driven from the master buck by a cable 42 (FIGURE 13) leading from the right end of the buck 10 around a guide pulley 43 to the right end of the buck 12 and by a second cable 44 leading from the left end of the buck 10 around a guide pulley 45 to the left end of the buck 12. This intercoupling between the two bucks causes one buck to be moved to one station as the other is moved to the other station, and vice versa.

On the outer sides of the buck frame plates 16 there are rows of compression springs 46 (FIGURE 15) each located by a headed pin 47 pressed into a respective aperture in the buck plate. Applied against the outer ends of the compression springs 46 is a cover screen 48, and overlying this screen are layers of cloth covering and padding generally referred to as 49. The cover and padding is draped over the top of the buck and drawn down taut at the bottom by wraps around tensioning rods 50 having spikes 51 for gripping the covering and padding. There are two tension rods at each side of the buck journaled in lugs 52 upstanding from the buck housing 17. Secured rigidly to the inner ends of the tensioning rods are clutch members 53 which are spring-pressed into a detenting engagement with cooperating clutch members 53a secured to the inner ones of the lugs 52. The spring pressure on the tensioning rods is obtained by compression springs 54 between the outermost lugs 52 and hexagonal heads 50a secured to the outer ends of the rods. The detenting of the tension rods can be overcome by a wrench applied to the hexagonal heads 50a but is sufficient to hold the covering and padding under sufficient tension.

Figures 14, 15:
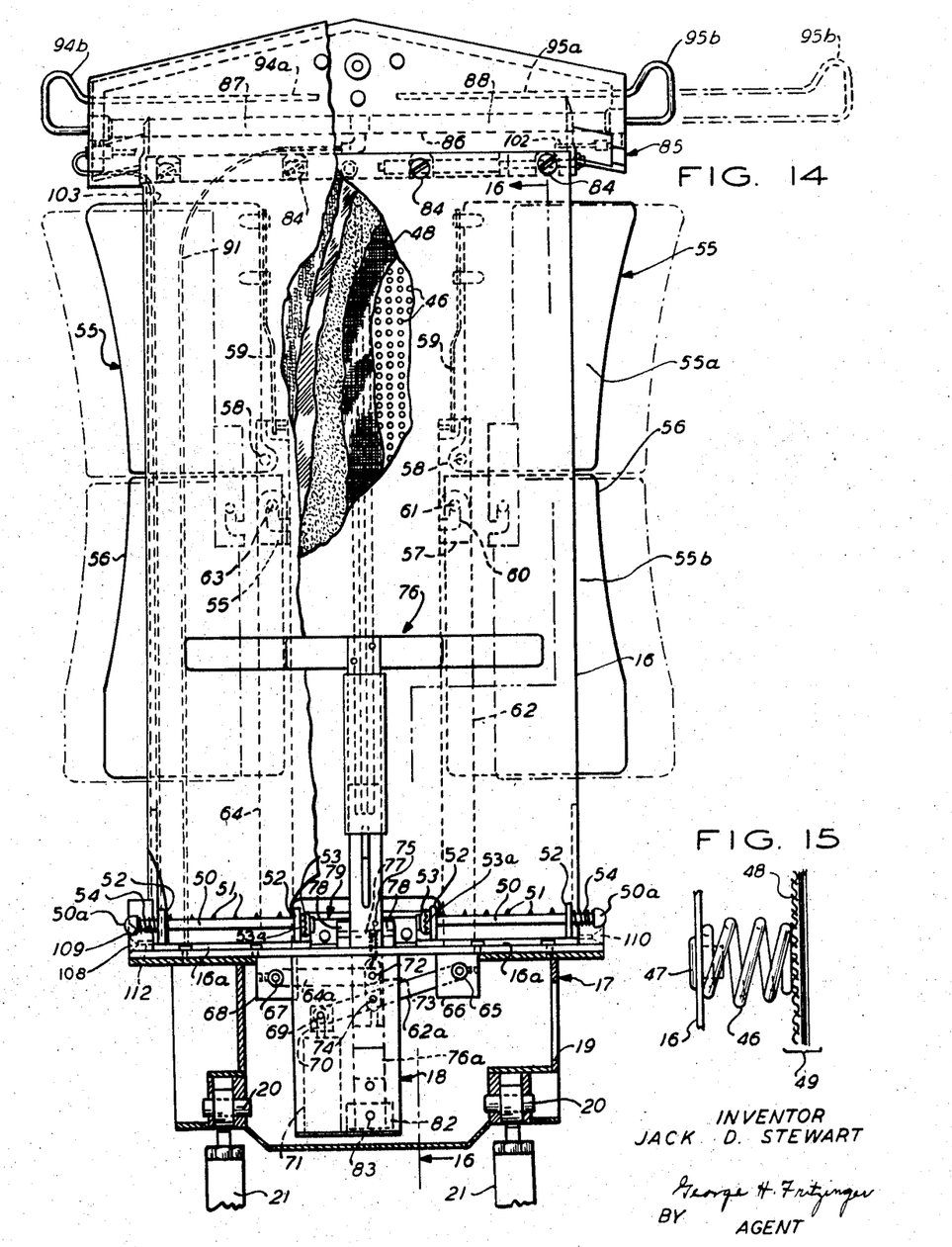
FIGURE 14 is a front elevational view of one of the bucks with parts in section and parts broken away to show better the internal mechanism.
FIGURE 15 is an enlarged fractional sectional view showing the spring padding on the buck.

At each side of the buck between the frame plates 16 is a wing 55 having an outer concave edge 56 as shown in FIGURE 14. Each wing includes upper and lower sections 55a and 55b of approximately equal height pivotally interconnected at their adjacent inner ends by a metal plate 57 secured to the lower section and by a pivot 58 of the upper section to the metal plate. Further, a cantilever spring 59 secured to the metal plate 57 extends upwardly therefrom to bear against the inner edge of the upper section to hold the wing sections closed as shown in FIGURE 14. In the lower part of each metal plate 57 there is a vertical slot 60 the lower end of which runs out the back edge of the metal plate. This slot enables the right wing to be hooked onto a stud pin 61 at the upper end of a long bell crank lever 62, and a left wing to be hooked onto a stud pin 63 at the upper end of a long bell crank lever 64. The bell crank lever 62 is pivoted on a shaft 65 supported between two frame blocks 66 depending from the buck frame (FIGURES 14 and 16). Similarly, the bell crank 64 is pivoted on a shaft 67 supported between a pair of depending frame blocks 68. The bell crank lever 62 has an obliquely extending arm 62a pivotally connected at 69 to the piston rod 70 of an air cylinder 71 forming part of the buck insert mechanism 18. The bell crank 64 has a right angle arm 64a pivoted at 72 to a link 73 which in turn is pivotally connected at 74 to an intermediate point of the arm 62a. When the air cylinder 71 is driven upwardly both bell crank levers are turned to shift the side wings outwardly into expanded positions indicated by dash-dot lines in FIGURE 14. A tension spring 75 connected to the link 73 acts to hold the side wings yieldably in their expanded positions. When the air cylinder 71 is actuated upwardly by air pressure the side wings are forced outwardly to hold the body of a shirt under a taut condition, which is the condition obtained when the shirt is being pressed as is later described, and when the air cylinder 71 is actuated downwardly the side wings are retracted to their full line positions against the tensioning of the spring 75 to allow a pressed shirt to be removed from the buck at the dressing station and another shirt to be dressed thereon. By providing each side wing in two sections which are yieldably intercoupled, the side wings are able to conform to the body of the garment being pressed so that the same is placed under uniform expansion to remove the wrinkles therefrom.

At the front of the buck is a T-shaped tail clamp lever 76 pivoted at 77 between a pair of blocks 78 on a bracket 79 mounted on the lower buck housing structure 17 between the buck plate flanges 16a (FIGURE 14). The bracket 79 has a pair of upwardly turned lugs riveted at 80 (FIGURE 16) to the corresponding buck plate 16. The tail clamp lever 76 has a depending arm 76a extending into the buck housing 17. A tension spring 81 connected to the arm 76a tends to hold the tail clamp closed. An air cylinder 82 has a piston rod 83 operable against the arm 76a to open the tail clamp against the tension of the spring 81.

Figure 12:
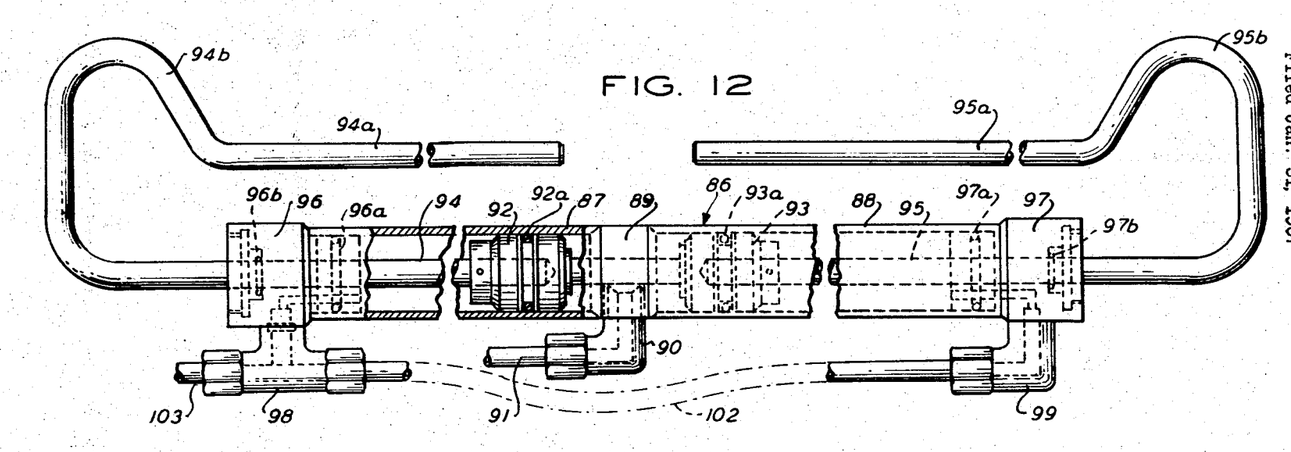
FIGURE 12 is a view to larger scale and partly in section showing the sleeve extender of one of the bucks.

Secured by screws 84 to the upper end of the buck frame plates 16 is a shoulder structure 85 over which the cover and padding 49 is draped and drawn down by the tensioning rod 50. This shoulder structure has a rounded top surface tapering outwardly to conform to the shoulder portion of a shirt (FIGURE 10); to this end the shoulder portion is also tapered downwardly from the center as shown in FIGURE 14. Mounted horizontally within the shoulder structure is a double air cylinder 86 comprising tubes 87 and 88 connected in line with each other to opposite ends of a central tubular fitting 89 (FIGURE 12). Connected to this fitting is a right angle nipple 90 for leading air pressure from a pipe 91 into the inner ends of the two tubes. Mounted slidably in the tubes 87 and 88 are respective pistons 92 and 93 provided with respective piston sealing rings 92a and 93a. Connected to the outer ends of these pistons are respective piston rods 94 and 95 which extend slidably through tubular end fittings 96 and 97. The end fittings 96 and 97 have external sealing rings 96a and 97a engaging the internal walls of the tubes and internal sealing rings 96b and 97b engaging the piston rods. Nipples 98 and 99 are threaded into the end fittings for feeding air pressure into the outer ends of the cylinder tubes.

The piston rods 94 and 95 are looped back on themselves shortly beyond the ends of the cylinders to form laterally extendable U-shaped arms 94a and 95a which serve when the air cylinders are actuated outwardly as sleeve extenders for a shirt dressed on the buck. The outer ends of the arms are provided with raised loops 94b and 95b so that the arms will operate better to exert a pulling effect on the sleeves to remove wrinkles therefrom as the arms are moved to their expanded positions. When a pressed shirt is to be removed from a buck the side arms are retracted by feeding air pressure into the outer ends of the cylinders through the nipples 98 and 99. As is shown in FIGURE 12, the nipple 98 is T-shaped and connected at one end by a pipe 102 to the nipple 99 so that both cylinders can be actuated inwardly from a common pressure source connected via pipe 103 to the other end of the T nipple.

The lower housing structure 17 of each buck is provided with two air inlet openings 108 and 109 at its back end (FIGURE 3) and with an air inlet opening 110 at its forward end (FIGURE 11) each of which is provided with a conical seat. As is shown in FIGURE 25, the back opening 108 is connected by air pipes 103 and 102 to the outer ends of the sleeve extender cylinders 87 and 88, by an air pipe 111 to the upper end of the side wing cylinder 71 and by an air pipe 112 to the tail clamp cylinder 82. The other back opening 109 is connected by the air pipe 91 to the inner ends of the sleeve extender cylinders 87 and 88. The front opening 110 is connected by an air pipe 113 to the lower end of the side wing cylinder 71.

As a buck is moved into the dressing station two spring-pressed snubbers 114 and 115 (FIGURE 1 and 24) engage the respective openings 108 and 109 to couple an outside air supply AS to the air cylinder in the buck. Similarly, as a buck is moved into the pressing station a spring-pressed snubber 116 (FIGURES 1, 21 and 24) engages the opening 110 to couple the air supply AS to the side-wing cylinder 71. Each of the snubbers 114–116 has spherical tips to engage the conical seats with an air tight seal.

There is also at the pressing station a large low pressure air snubber 117 (FIGURES 1 and 21) comprising a pipe with a flanged head 118 overlaid by a layer 119 of silicon for engaging the right end wall of the buck housing 17 to couple an air duct 120 to the buck carriage via the end wall opening 19 shown in FIGURE 11. The snubber 117 is in telescopic engagement with a pipe 121 leading from the air duct 120 and is spring-urged by springs 122 to engage the buck end wall under sufficient pressure to provide an air tight seal around the opening 19. The air duct 120 is coupled via a downwardly extending pipe 123 and a side opening 124 to a heating chamber 125 having therein a heating coil 126 diagrammatically indicated in FIGURE 1. The heating chamber is connected by duct work 127 to a blower fan 128 located in a lower central part of the machine. Thus, when a buck is moved into the pressing station hot air is blown into the buck from the bottom. This hot air passes up through the buck and out through the padding at the sides and through the sleeve openings at the top causing the sleeevs to be puffed out to remove wrinkles during the time a shirt is being pressed. Further, the hot air serves to dry the padding to assure that the pressed shirt will be dry when it is removed from the buck.

Figures 6, 7, 8:
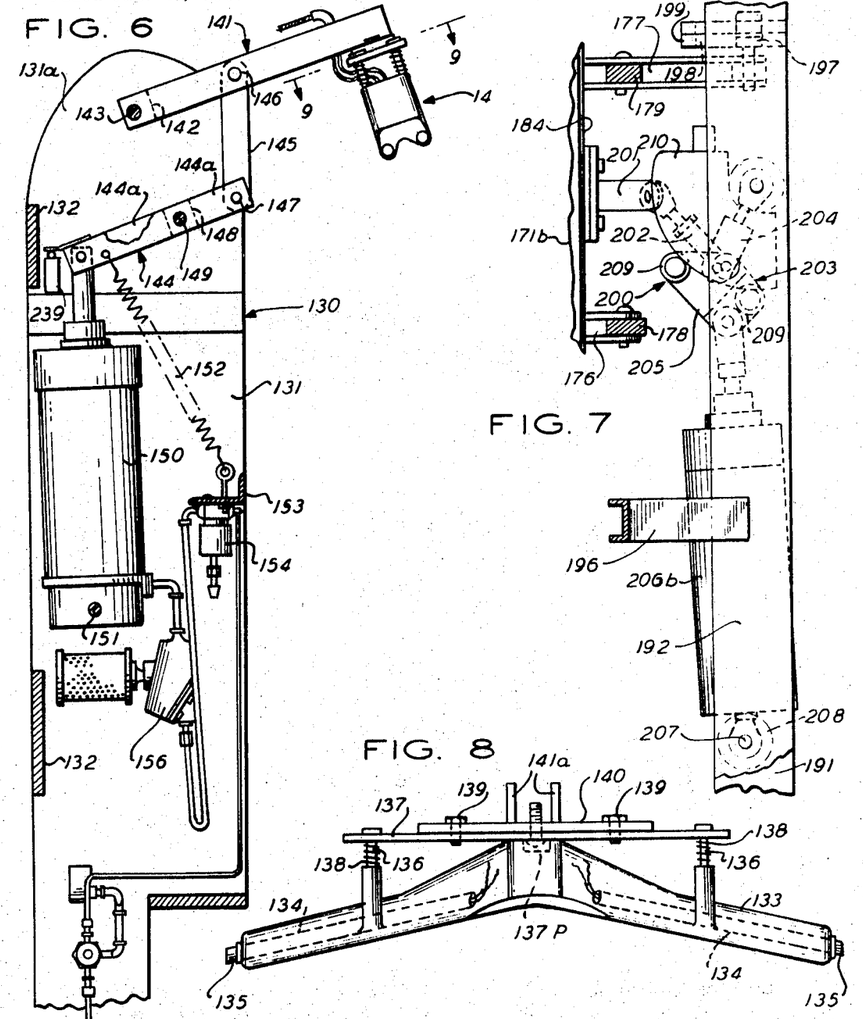
FIGURE 6 is a fractional vertical view partly in section on the line 6—6 of FIGURE 5.
FIGURE 7 is a sectional view taken on the line 7—7 of FIGURE 5 showing the toggle-eccentric mechanism for operating each chest.
FIGURE 8 is a front elevational view of the shoulder pressing yoke shown in FIGURE 6.
Figure 9:
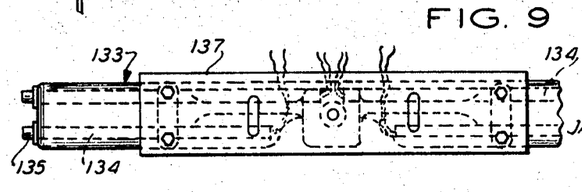
FIGURE 9 is a top view of the shoulder pressing yoke as seen from the line 9—9 of FIGURE 6.

Back of the buck 10 at the dressing station is an upright frame structure 130 comprising two spaced vertical frame plates 131 having portions inwardly offset toward each other near the top (FIGURES 5 and 6). The frame plates are interconnected by tie bars 132 to form a rigid frame structure for the shoulder ironer 14. This ironer comprises a yoke 133 of a wide open V-shape as viewed from the front (FIGURE 8). The yoke has a polished ironing surface at the bottom which is of an inverted trough-like shape as viewed from the side (FIGURES 3 and 6). The yoke is cast to shape as of aluminum and is preferably heated by electric current. To this end it is provided with cast-in metal tubes 134 in which are inserted suitable heater cartridges 135. Threaded into upright bosses at each side of the yoke are stud bolts 136 which pass through apertured end portions of a mounting plate 137. The yoke has a universal pivot connection 137p at its center to the plate 137 permitting it to tilt to conform to the shoulder portion of the buck, but the yoke is yieldably held in a level position by compression springs 138 on the stud bolts 136 between the yoke and the plate 137. The mounting plate is secured by screws 139 to a crosss bar 140 which is welded to the outer end of a lever 141. This lever comprises two parallel members 141a welded together through spacing blocks 142. The lever 141 is pivoted on a cross shaft 143 carried by the frame plates 131 and is coupled to a lever 144 by a link 145 pivoted at 146 to the lever 141 and to the lever 144 at 147. The lever 144 comprises two parallel members welded together through spacing block 148. The lever 144 is pivoted at an intermediate point thereof on a cross shaft 149 carried by the frame plates 131 and is connected at its far end to the piston rod of an upright air cylinder 150. The air cylinder is located between the frame plates 131 and is pivotally mounted on a cross shaft 151 carried by the frame plates 131. A tension spring 152 connected between the back end of the lever 144 and a bracket 153 between the frame plates 131 holds the air cylinder normally in an unoperated position and the yoke 133 in a raised position above the buck at the dressing station.

Figure 17:
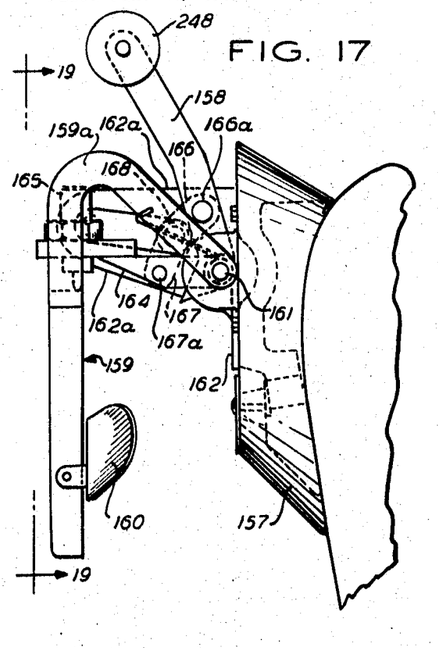
FIGURE 17 is a side elevational view of the collar clamp on each of the bucks showing the clamp in unoperated position.
Figure 19:
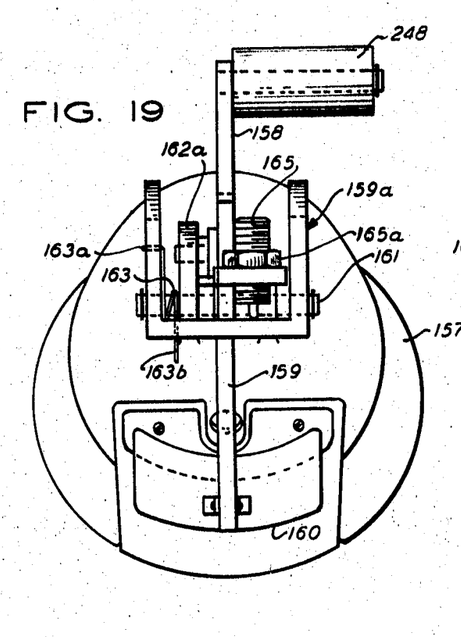
FIGURE 19 is a front view of the collar clamp as seen from the line 19—19 of FIGURE 17.
Figure 20:
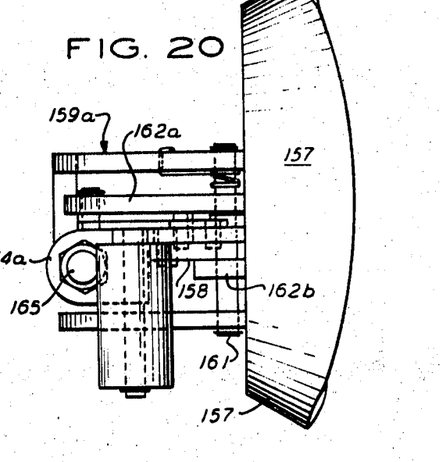
FIGURE 20 is a top plan view of the collar clamp.

Mounted on the upper central portion of each buck is an approximately circular collar block 157 extending from the buck in a forward-upward direction (FIGURES 3, 17 and 20). After dressing a shirt on the buck and buttoning the collar around the collar block, the operator trips an upwardly extending handle 158 in a forward-downward direction to the position shown in FIGURE 18 to cause a clamp lever 159 to be moved rearwardly towards the collar block. This clamp lever carries an arcuate clamp plate 160 against the forward part of the shirt collar below the collar block. The clamp lever 159 is pivoted on a cross shaft 161 carried by two laterally spaced arms 162a and 162b on a bracket 162. As later described, the arm 162a is made quite long to provide a second pivot support spaced substantially from the collar block for the collar clamp mechanism. The inner portion 159a of clamp lever 159 is U-shaped as viewed from the front of the buck in FIGURE 19, but the side legs of this U-shaped member have a goose-neck shape as viewed in FIGURE 17. The U-shaped member 159a bridges the bracket arms 162a and 162b and pivots on the end portions of the shaft 161. A torsion spring 163 on the left end portion of the shaft 161 has one tail 163a bearing against the under side of one leg of the U-shaped member 159a and another tail 163b bearing against the collar block to urge the clamp lever 159 to its open position shown in FIGURE 17. The handle 158 pivots on a central portion of the shaft 161 between the bracket arms. Pivoted also on the central portion of the shaft next to the handle 158 is a press arm 164 which has a turned over lug 164a at its outer end located between the side legs of the U-shaped member 159a. Threaded through this lug is an adjusting screw 165 the lower point of which bears against the cross arm of the U-shaped member 159a. The handle 158 is coupled to the press arm through two tandem-connected links 166 and 167 of which the link 166 is pivoted to the handle at 166a and to the link 167 by pivot pin 168 and of which the link 167 is pivoted to the press lever 164 at 167a. Also, a brace link 169 is pivoted at one end to the pivot pin 168 and at the other end at 170 to the outer end portion of the long bracket arm 162a.

Figure 18:
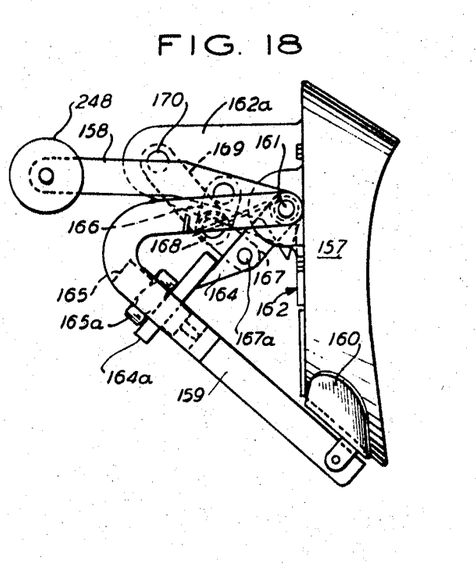
FIGURE 18 is another side elevational view of the collar clamp showing the same in operated position.

When the handle 158 is swung downwardly from its upright position shown in FIGURE 17, it moves the press arm 164 downwardly through the links 166 and 167, causing the adjusting screw 165 to bear against the cross arm of the U-shaped member 159a to shift the clamp lever 159 into its operate position shown in FIGURE 18. Upon removing downward pressure from the handle, the torsion spring 163 tends to swing the clamp lever 159 back and in so doing it bears against the press arm 164. However, the pivot pin 168 between the two links is now in a past-center position with respect to a line between the pivot 167a where the link 167 is connected to the press arm and the pivot 170 where the brace link 169 is pivoted to the bracket arm 162a, causing the clamp lever 159 to be locked in its operated position against being returned by the torsion spring 163. The locked position of the clamp lever is adjustable by the adjusting screw 165. When this adjusting screw is turned to a desired position it is locked in place by a lock nut 165a.

Although the clamp lever is latched against being returned by the torsion spring it can be released by the handle 158. For instance, upon exerting an upward thrust on the handle 158 from its operated position, the pivot pin 168 is moved back across the center line just described, with the result that the torsion spring 163 becomes thereupon effective to return the clamp mechanism back to its unoperated position.

Figures 21, 22, 23:
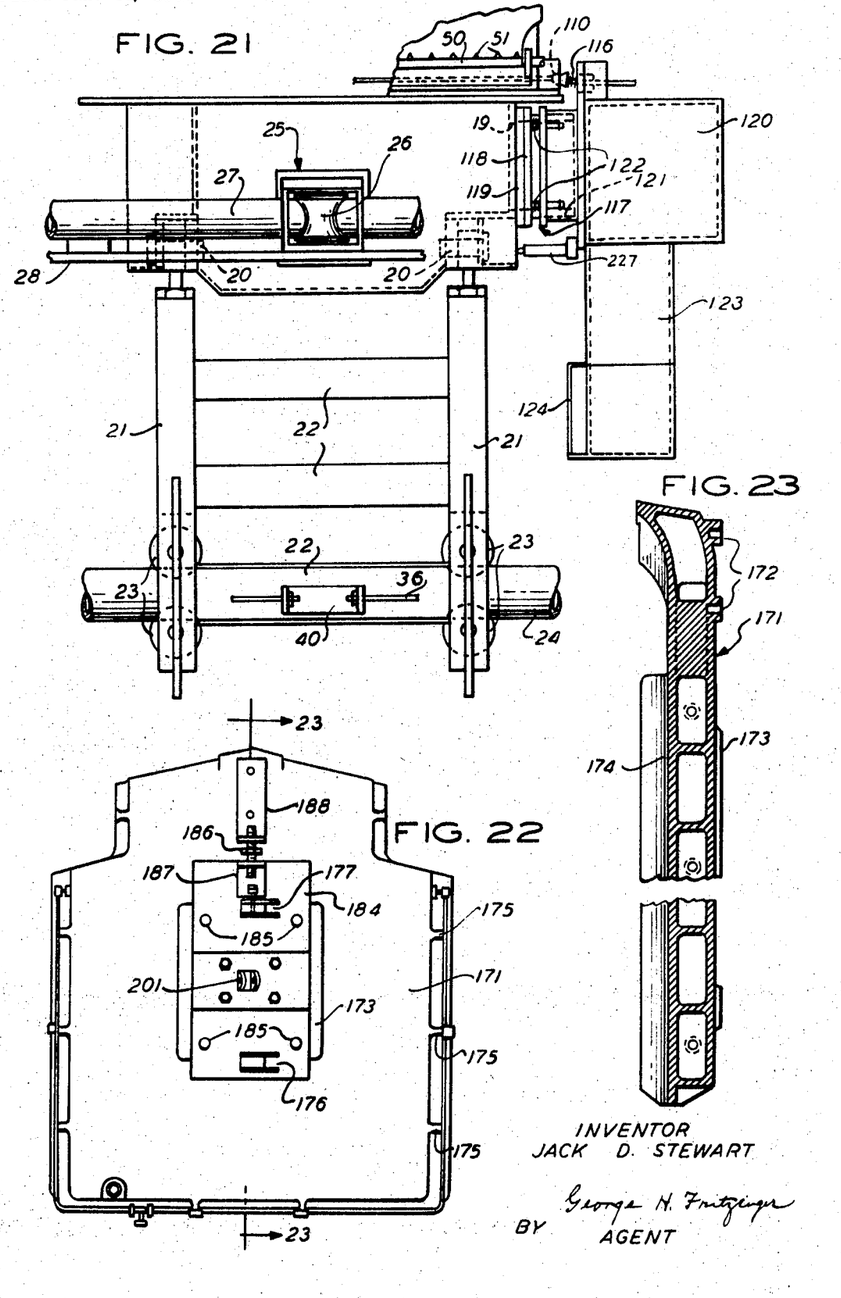
FIGURE 21 is a fractional front elevational view of the lower structure and carriage of a buck at the pressing station, showing also the air snubbers in engagement with the buck.
FIGURE 22 is a rear view of one of the pressing chests.
FIGURE 23 is a vertical section through the chest on the line 23—23 of FIGURE 22.

At the front and back sides of the buck 12 in the pressing station 13 are pressing chests 171f and 171b. Each pressing chest is of a hollow construction cast as of aluminum. In the casting operation it is provided with raised mounting bosses 172 and 173 on its outer side and with a polished pressing surface 174 on its inner side shaped to conform to the confronting surface of the buck (FIGURE 23). The pressing chests are suitably heated as by steam through fittings 175 but alternatively it may be heated electrically as described in my pending application Ser. No. 568,315, filed July 8, 1966.

Secured to the back side of each chest are a lower pair of lugs 176 and an upper pair of lugs 177 (FIGURE 22) to which the ends of respective horizontal support arms 178 and 179 are pivotally connected. The other ends of these arms are hinged to respective lugs 180 and 181 welded to the respective frame angle bars 29 (FIGURE 5). Support arms 178 and 179 are interconnected by a vertical bar 182 at their hinged ends and are further rigidified by a diagonal brace 183 all secured into a welded integral structure. The lugs on the back side of the chest are secured to a mounting plate 184 bolted at 185 to the boss 173 (FIGURE 22). When the bolts 185 are loosened, the chest can be adjusted vertically by an adjusting stud bolt 186 having left and right threaded end portions threaded through respective brackets 187 and 188 secured respectively to the mounting plate 184 and to the upper part of the chest. Further, the support arms 178 and 179 include central tubular portions which are left and right threaded to the end portions pivotally connected to the chest and angle bars so that the chest can be adjusted sidewise with respect to the buck. By these vertical and horizontal adjustments each chest can be positioned to conform precisely to the adjacent surface of the respective buck.

The frame for the pressing station includes a pair of spaced vertical channel bars 189 and 190 at the front side of the machine and a pair of spaced vertical channel bars 191 and 192 at the back of the machine. These pairs of channel bars are equally spaced from the medial longitudinal plane P (FIGURE 2) of the machine and are symmetrically located with respect to a plane M transverse to the plane P through the center of the buck 12 at the pressing station. Also, the pairs of channel bars 189–190 and 191–192 are spaced further from the medial plane P than are the respective frame angle bars 29 at the right end of the machine. Between the channel bar 190 and the respective angle bar 29 are upper and lower braces 193 and 194, and between the channel bar 192 and respective angle bar 29 are upper and lower braces 195 and 196 all of which are welded in place at their ends as shown in FIGURES 1, 2, 5 and 10. This frame structure at the pressing station is covered by suitable panels (not shown) to form a cabinet which is open only at the left side as it would appear in FIGURE 2 to permit the bucks to be moved back and forth interchangeably between the pressing and dressing stations.

The upper pair of lugs 177 on each chest is extended transversely of the machine to pass through the spaces betwen the respective pairs of channel bars 189–190 and 191–192 (FIGURES 1, 2, 7 and 10). The end portion of these lugs have rollers 197 journaled thereon which engage guide slots 198 in cam plates 199 welded between the respective channel bars. The cam slots 198 are angularly shaped as shown in FIGURE 2 to guide the chests in a parallel movement through about one inch travel into and out of engagement with the buck and to guide the chest with a swinging movement there beyond as the support arms 178–179 are turned on the hinges 180–181.

The chests are moved into their opened and closed positions relative to the buck 12 preferably by toggle-eccentric mechanisms 200 as fully described in my pending application Ser. No. 568,315, filed July 27, 1966, (now Patent No. 3,378,178, dated Apr. 16, 1968), and to which reference may be had as to mechanical details. Suffice for the present to say that bolted on the mounting plate 184 between the pairs of supporting lugs 176 and 177 is a bracket 201 extending from the back side of each chest (FIGURES 10, 7 and 22) to which is pivotally connected an arm 202 of a toggle mechanism 203 including a second arm 204 pivoted to the respective channel bars 189–190 or 191–192. The two toggle arms are pivoted at their inner ends to a pair of connector blocks 205 at points offset from each other to form an eccentric. Pivotally connected to these connector blocks is the armature of an air cylinder located between the channel bars, there being an air cylinder 206b for the back chest 171b and an air cylinder 206f for the front chest 171f. Each cylinder is pivoted at its bottom on a shaft 207 mounted in bearings 208 welded to the inner sides of the channel bars (FIGURE 5). Journaled on the outer sides of the connector blocks are side rollers 209 which ride on fixed cam plates 210 to guide the connector blocks through a first translational movement and then through a final rotational movement. When the air cylinder is actuated upwardly the connector blocks are shifted upwardly in translation to open the toggle mechanism and are then shifted in rotation while the chests are in their final parallel-movement range to move the chests against the buck by eccentric action. The advantage of the final movement of the chests by eccentric action is that the chests can follow the buck and continue to exert a uniform pressure thereagainst even as the padding of the buck breaks or beats down through long usage of the pressing machine.

Figure 24:
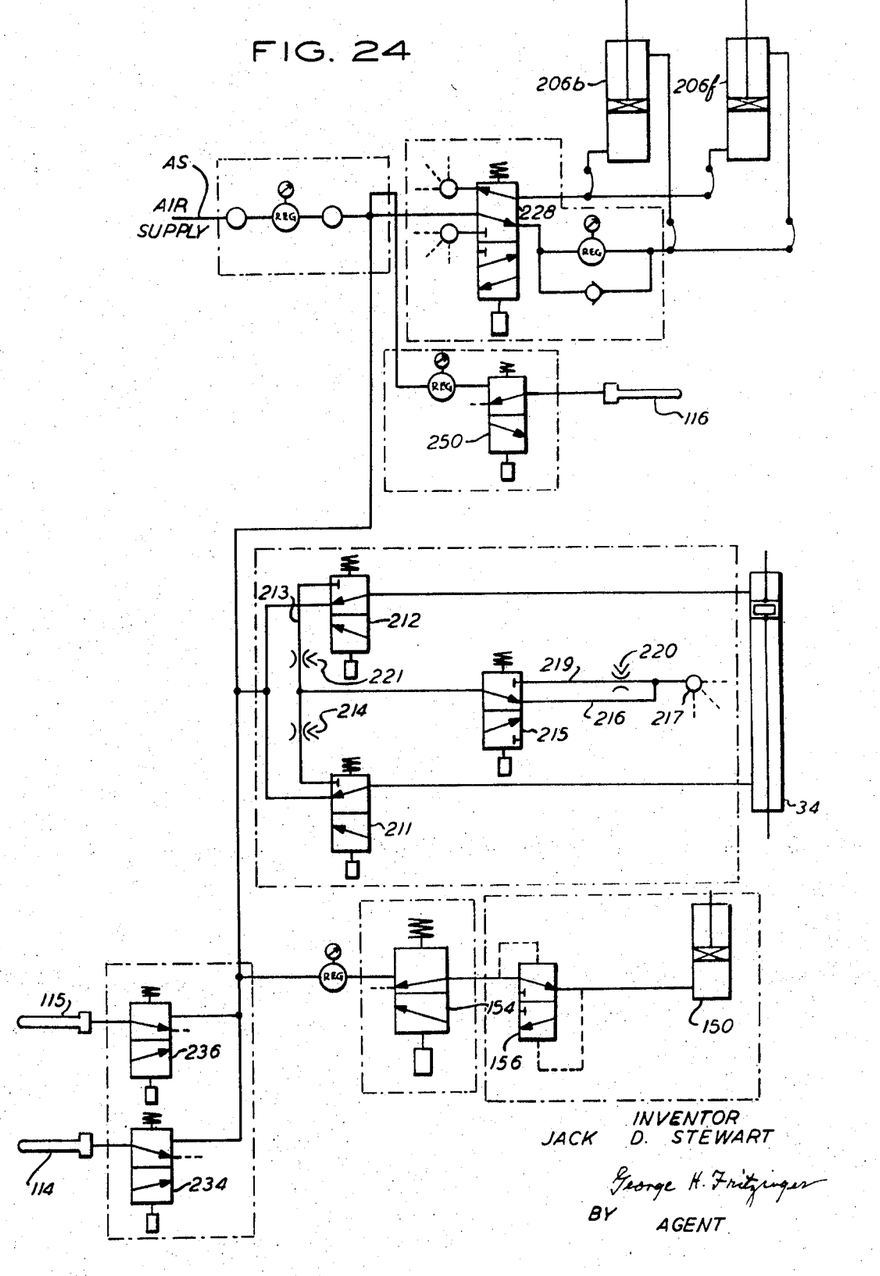
FIGURE 24 is a schematic of the pneumatic control system of the machine.

The control means for the drive cylinder 34 for the master buck 12 comprises two solenoid valves 211 and 212 (FIGURE 24). These control valves are spring-biased to apply equal pressure normally to both ends of the drive cylinder 34 to cause the piston 35 to be normally at a standstill. When the master buck 12 is at the dressing station the piston 35 is at its right end of travel as shown in FIGURE 24. If the solenoid valve 211 is now opened the right end of the drive cylinder is connected to an exhaust line through a needle valve 214, a solenoid valve 215, a bypass 216 and a muffler 217 to the outside air. This starts a high speed travel of the bucks causing the master buck 12 to be moved from the dressing to the pressing station and the slave buck to be moved from the pressing to the derssing station. However, when the master buck reaches an approximate midposition in its travel between the two stations shown dottedly in FIGURE 13 it operates momentarily a photocell 244, which is later described with reference to FIGURE 26, to cause operation of the solenoid valve 215. The solenoid valve now directs the exhaust through a second bypass line 219 including a second needle valve 220. The latter needle valve is set to retard the exhaust and slow down the speed of travel of the bucks. This slow down of the bucks assures that a smooth transfer is obtained. When the master buck reaches the pressing station the piston 35 will be at its left end of travel. If the solenoid 211 is now dropped back to neutral position equal pressure will be again applied to both ends of the piston 35 causing the bucks to remain at standstill. However, if the solenoid valve 212 is next operated the right end of the drive cylinder will be connected to the exhaust line through a needle valve 221 corresponding to the needle valve 214 above described causing the bucks to start at a high speed of travel to return the master buck to the dressing station and the slave buck to the pressing station. Again, at the midposition the master buck will trigger the solenoid valve 215 to direct the exhaust through the needle valve 220 to slow down the speed of travel.

Figure 26:
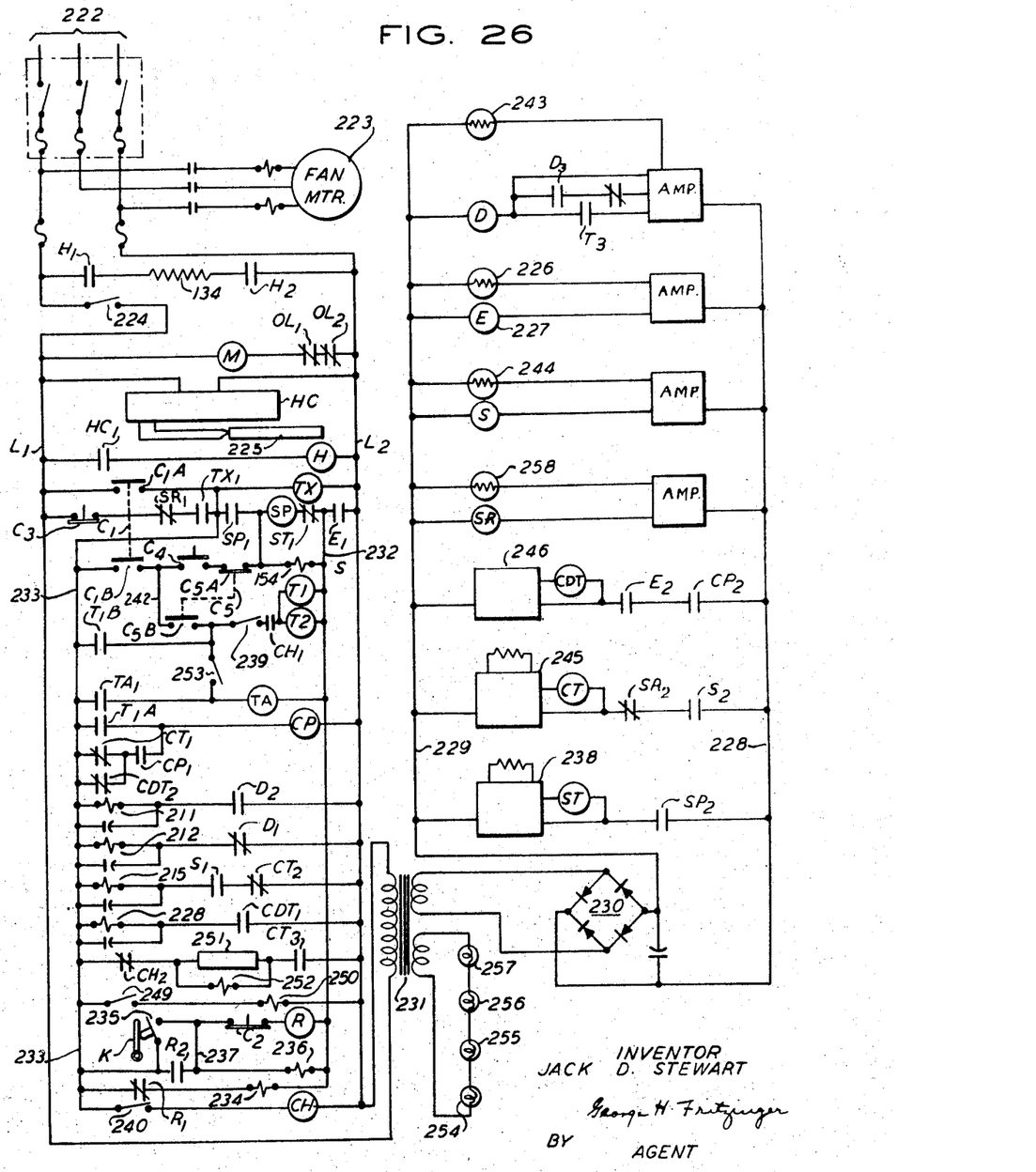
FIGURE 26 is a schematic circuit diagram of the electrical control system of the machine.

An illustrative arrangement of the electrical control circuitry of the machine is shown in FIGURE 26. The circuits are operated from a three-wire 230 volt power source 222 via lead wires $L_1$ and $L_2$. Connected directly across these lead wires is a motor 223 for the fan 128. When an on-off control switch 224 in one side $L_1$ is closed, a heater relay HC controlled by a thermostat 225 is connected in circuit. This relay controls switch contacts $HC_1$ to activate a relay H. Activation of this relay closes switch contacts $H_1$ and $H_2$ to engage the shoulder ironer-heaters 134. When either buck 10 or 12 is in the pressing station an end photocell 226 is blocked off to cause the end relay 227 to be activated from a pair of D.C. power lines 228 and 229 connected to the A.C. lines $L_1$–$L_2$ via a full wave rectifier 230 and a transformer 231. A switch $E_1$ is then closed to connect a bus line 232 to one side of the 230 volt source.

Let it be assumed that the master buck 12 is in the dressing station carrying a pressed shirt thereon and that the slave buck 10 is in the pressing station. Upon the operator pressing the common push button switch $C_1$ a relay TX is activated via a switch $C_1A$ from the power lines $L_1$ and $L_2$ to close the switch contacts $TX_1$. This connects a bus line 233 to the power line $L_1$ after release of the push button switch $C_1$ via a stop switch $C_3$, relay switch $SR_1$ and relay switch $TX_1$. Power is therefore supplied to a solenoid valve 34 from a line 233 via a relay switch $R_1$ and the relay switch $E_1$ to the power line $L_2$. Operation of the solenoid valve 234 supplies air pressure to the air snubber 114 (FIGURE 24) which now engages the inlet opening 108. This air pressure is led by the air pipe 112 (FIGURE 25) to the tail clamp cylinder 82 to open the tail clamp 76 against the force of the return spring 81; simultaneously, air pressure is fed by the air line 111 to the upper end of the side wing cylinder 71 to retract the side wings against the force of the spring 75, and air pressure is fed by the air pipes 103 and 102 to the outer ends of the air cylinder 87 and 88 to retract the sleeve extender arms. Since the collar clamp has already been tripped to open position by a member 247 on the chests (FIGURE 10) moving against a roller 248 on the lever 158 as the pressing chests were closed at the pressing station, the shirt on the buck 12 is now ready to be removed. Upon the removal thereof, another shirt to be pressed is dressed on the buck 12.

After dressing another shirt on the buck 12, the operator latches the collar block and then while holding the tail of the shirt under the tail clamp 76 he presses the knee plate K. This closes a switch 235 to operate the solenoid valve 236 from the bus line 233 to the line 232 via a jumper 237, and simultaneously it operates a relay R via the release push button switch $C_2$. Operation of the relay R closes a switch $R_2$ to provide a hold circuit for both the relay R and the solenoid valve 236 after the knee plate K is released, and it opens the switch $R_1$ to drop the solenoid valve 234.

The dropping of the solenoid valve 234 shuts off air pressure from the inlet opening 108 causing the tail clamp 76 to remain engaged by the pressure of the spring 81 and causing the side wings 55 to remain expanded by the force of the spring 75. At the same time air pressure is removed from the outer ends of the cylinders 87–88 to allow the sleeve extender arms to be moved to their outer positions. The operation of the solenoid valve 236 brings air pressure immediately to the inlet opening 109 and then via the air pipe 91 to the inner ends of the cylinder 87–88 to drive the sleeve extender arms to their expanded positions whereby to stretch out the sleeves of the shirt on the buck. After pressing the knee plate K the operator presses the common push buttons $C_1$ and shoulder press button $C_4$ to cause the shoulder ironer at the dressing station to go through a timed operaton herein next described.

When the common push button $C_1$ and shoulder-press button $C_4$ are pressed, a circuit is completed from the power line $L_1$ via switch $C_1A$, bus line 233, switch $C_1B$, switch $C_4$, switch $C_5A$, shoulder solenoid valve 154, bus line 232, and switch $E_1$ to the power line $L_2$ whereby to activate the shoulder solenoid valve 154. At the same time there is activated a relay SP which is connected in parallel with the shoulder solenoid valve 154 via a switch $ST_1$. Switch $SP_1$ of the SP relay is thus closed to keep the relay SP activated via switch $SR_1$ and emergency stop switch $C_3$ after the common and shoulder press push buttons are released. Another switch $SP_2$ of the SP relay connects the shoulder press timer 238 across the D.C. bus lines 228 and 229. When the timer arrives at its preset time (typically 30 to 45 seconds) it activates the ST relay to open a switch $ST_1$ and drop the SP relay. The dropping of the SP relay opens a switch $SP_1$ to drop the shoulder solenoid valve 154 and complete the shoulder press cycle.

When the solenoid valve 154 was operated air pressure was led to the air cylinder 150 (FIGURE 24). Operation of the air cylinder 150 caused the yoke 133 to be moved down onto the shoulder portion of the buck at the dressing station, typically with a force from 600 to 1200 pounds. When the air cylinder was cut off by the timer 238, a dump valve 156 permitted the air to exhaust rapidly from the air cylinder 150 responsive to the spring 152 to move the yoke 133 to its raised position.

After completing the shoulder press operation, the operator presses the common and travel push button switches $C_1$ and $C_5$ to start an interchange of the two bucks at the dressing and pressing stations. However, a prerequisite to starting the drive mechanism for the bucks is that the pressing chests at the pressing station and the shoulder ironer at the dressing station be both open. For this reason safety switches 239 and 240 are provided in the electric circuits. The safety switch 239 is controlled by the shoulder ironer as by interposing the switch between the frame and the lever 144 (FIGURE 6), and the safety switch 240 is controlled by the pressing chests as by interposing the switch between an arm 241 on the piston rod of the air cylinder 206b and the housing of the air cylinder (FIGURE 5). The safety switches are biased open and are closed only when the shoulder ironer and chests are open. The safety switch 240 is connected in series with a relay CH to operate this relay from the bus line 233 and power line $L_2$ when the switch is closed. Operation of the relay CH closes its switch $CH_1$ to prepare a drive circuit for the bucks herein next described.

When the common and travel push button switches $C_1$ and $C_5$ are pressed while the shoulder ironer and pressing chests are open, relays $T_1$ and $T_2$ are operated from the bus line 233 via switch $C_1B$, lead wire 242, switch $C_5B$, yoke safety switch 239, switch $CH_1$, relays $T_1$ and $T_2$ in parallel, bus line 232 and switch $E_1$ to power line $L_2$. Operation of the travel relay $T_1$ closes a switch $T_1A$ to operate the relay CP and it closes a switch $T_1B$ to provide a hold circuit for the relay after the push button switches $C_1$ and $C_5$ are released. The relay CP is a "chest prevent" relay to prevent the pressing chest from closing until the bucks are in their end positions. Since the master buck 12 is presently considered as being at the dressing station the direction photocell 243 is blocked off and the relay D is operated. Operation of the relay D opens a switch $D_1$ to deenergize the reverse relay 212 and it closes a switch $D_2$ to energize the forward solenoid valve 211 whereby to start the drive of the master buck towards the pressing station and of the slave buck to the dressing station. When the buck moving toward the pressing station has traveled approximately two-thirds the distance, the buck blocks a slow down photocell 244 causing a relay S to be energized. The relay S closes a switch $S_1$ to energize the slow down solenoid valve 215 to decelerate the travel of the bucks. Also, the relay S closes a switch $S_2$ to start the body chest timer 245. When the bucks reach their end positions, the buck at the pressing station blocks the end photocell 226 to energize the end relay 227. Operation of the end relay closes a switch $E_2$ to start the chest delay timer 246. This timer has a fixed time period of approximately one-third second. The purpose of this timer is to delay the closing of the pressing chests until the buck has come to a steady rest at its end position. When this delay timer 246 has timed out, a relay CDT is energized. Operation of this relay closes a switch $CDT_1$ to activate a chest solenoid valve 228. Operation of this solenoid valve brings air pressure to the two air cylinders 206f and 206b for the two pressing chests. The activation of these air cylinders causes the pressing chests to be closed in the manner hereinbefore described. As the pressing chests are closed the chest switch 240 is opened to drop the CH relay which in turn opens the switch $CH_1$ to prevent the machine to recycle until the pressing chests are open. Also, as the pressing chests are closed through their final parallel movement a switch 249 mounted on the front cam plate 199 is operated by the respective guide roller 197 (FIGURES 1 and 2) to activate a solenoid valve 250 (FIGURE 24). Operation of this solenoid valve feeds high pressure air via the snubber 116 to the wing expander cylinder 71 of the buck at the pressing station. This places a high sidewise tension on the body of the shirt to remove all wrinkles at the time the shirt is being pressed. This tension is maintained until the chests are opened. The pressing operation of the chests occurs well within the time period used by the operator to remove a pressed shirt from the buck at the dressing station and to dress another shirt thereon.

When the body chest timer 245 reaches its preset time, a relay CT is energized. This opens a switch $CT_1$ to drop the relay CP since the relay CDT is already operated causing its switch $CDT_2$ to be opened. The opening of switch $CP_2$ drops a timer 246 to deenergize the relay CDT. This deenergization of the relay CDT causes the switch $CDT_2$ to reclose but without effect because the switch $CP_1$ is open, and it causes the switch $CDT_1$ to open to drop the chest solenoid valve 228. The valve 228 is then spring returned to cause air to be supplied to the top of each cylinder 206. This returns the air cylinder pistons to their down positions to return the chests to their open positions. The operation of the relay CT opens the switch $CT_2$ to deenergize the slow down solenoid valve 215; this allows the bucks when recycled to start at the accelerated speed. The relay CT also closes the switch $CT_3$ to set up the counter 251 and sleeve rod retract valve 252 so that when the chest switch 240 is closed the switch $CH_2$ will be operated to activate the counter and to retract the rods. This circuit assures that the body timer 245 must have been closed and then must have been timed out in order for the counter to register a count.

The machine is now ready to be recycled. The sequence of operation is the same as in the first cycle above described, except that now the slave buck is in the dressing position and the master buck in the pressing position at the start of the cycle. This means that the direction photocell 243 is not blocked off and that the D relay is deenergized. When the D relay is deenergized the reverse solenoid valve 212 is energized when the common and travel push buttons $C_1$ and $C_5$ are depressed. Since the D relay is the only device that controls the travel, the bucks are always under power unless the emergency stop button $C_3$ is depressed.

To prepare the machine for semi-automatic operation the operator closes the semi-automatic switch 253. Upon then pressing the common and travel push button $C_1$ and $C_5$ while the chests are still closed, a recycling will start automatically as soon as the chests have reached their open positions. For instance, when the semi-automatic switch 253 is closed, the relay TA is energized responsive to depressing the common and travel push button $C_1$ and $C_5$. The operation of the relay TA closes a switch $TA_1$ to provide a hold circuit for the TA relay. As soon as the CH relay is energized by the remaking of the chest switch 240 and the yoke switch 239 is closed by the raising of the shoulder irons, the travel relays $T_1$ and $T_2$ will be energized to start the recycling of the machine.

If at any time during a cycle of the machine, the emergency stop push button $C_3$ is depressed, power will be cut off from the bus line 233 to stop all machine functions. Also, all functions of the machine will be stopped if any one of the light bulbs 254–257 respectively for the photocells 243, 226, 244 and 258 should burn out, since all of the lights are connected in series (FIGURE 26). This means then that the safety cell 258 is also energized to operate the SR relay. Operation of this relay opens the switch $SR_1$ to produce the same effect as when the emergency stop push button is depressed.

I claim:

1. In a shirt pressing machine having dressing and pressing stations: the combination of a frame, two bucks at said stations respectively, a carriage structure secured to the bottom of each of said bucks, respective parallel support rails at the bottom of said frame for said bucks, roller means connecting the lower ends of said carriage structure to said support rails for movement of the carriage structure along the rails and for sidewise movement thereabout, respective guide rails for said bucks, and control arms secured to said bucks having roller means embracing said guide rails to hold said bucks above a midposition between said support rails when the bucks are at said stations, said guide rails having intermediate outwardly curved portions to swing said bucks apart at a clearance distance from each other to allow the bucks to pass each other in their movements between said stations.

2. The shirt pressing machine set forth in claim 1 including guide pulleys respectively at opposite ends of said machine beyond the end positions of said bucks, a pair of cables connected between said bucks and trained respectively around said guide pulleys for causing one of said bucks to be moved to one of said stations as the other is moved to the other station, and vice versa, and an air cylinder drive means connected to one of said bucks for moving the bucks interchangeably between said stations.

3. The shirt pressing machine set forth in claim 2 wherein said drive means includes a single air cylinder extending lengthwise of the machine throughout the length of travel of each of said bucks, a piston in said air cylinder, guide pulleys at the ends of said air cylinder, cables connected between opposite ends of said piston and one of said bucks, said cables leading out the opposite ends of said air cylinder and around the respective ones of said guide pulleys to said one buck, end fittings in said air cylinder having central openings through which said cables slidably pass, said cables having smooth cylindrical surface in air tight engagement with said end fittings, and means for feeding air pressure to said air cylinder to drive said piston back and forth to shift said bucks interchangeably between said stations.

4. In a machine for pressing shirts or similar articles: the combination of an elongate frame, a buck mounted for movement lengthwise of said frame between dressing and pressing stations, an air cylinder extending lengthwise of the frame through the movement range of said buck having end fittings and a piston, guide rollers at the ends of said piston, a cable connected between opposite ends of said piston and said buck, said cable leading slidably through said end fittings in air tight relation thereto and around said guide rollers so that air pressure applied to the opposite ends of said piston will produce a movement of said buck throughout its movement range, an air pressure source, and valve means operable to supply said air pressure equally to the opposite ends of said piston to hold said buck stationary or to either end of said piston while exhausting the other end of the piston to the atmosphere to drive said buck in either direction between said stations.

5. The shirt pressing machine set forth in claim 4 wherein said valve means includes means controlled by said buck as it is moved through a central portion of its travel range for restraining the exhaust air from said cylinder whereby to slow down the movement of the buck before it enters said respective stations.

6. The shirt pressing machine set forth in claim 5 including control means for said valve means operable to exhaust either end of said air cylinder to the outside atmosphere to cause said piston to be driven lengthwise of said air cylinder, and means controlled by said buck when the same reaches one of said stations for returning the valve means to the condition wherein equal air pressure is applied to both ends of said piston to stop the drive of the buck when it reaches said respective stations.

7. The shirt pressing machine set forth in claim 6 including sensing means at one of said stations operable by the said buck as it moves into said station for conditioning said valve means so that upon again operating said control means after the buck has been stopped at said station the end of said air cylinder will be exhausted to the outside atmosphere to interchange the positioning of said buck with respect to said stations.

8. In a shirt pressing machine including pressing and dressing stations: the combination of a pair of bucks, drive means for moving said bucks interchangeably between said stations, a shoulder press at the dressing station operable into pressing engagement with a buck at said station, operating means for said shoulder press, electrical control means for said operating means including a manual start switch, and sensing means at said pressing station for placing said electrical control means in an operable condition responsive to said manual start switch only when there is a buck at said pressing station.

9. In a shirt pressing machine including pressing and dressing stations: the combination of a pair of bucks, drive means for moving said bucks interchangeably between said stations, a pair of body pressing chests at said pressing station operable into closing engagement with a buck at said station, means for closing said body pressing chests, sensing means activated by arrival of a buck at said pressing station, and control means responsive to said sensing means for starting said chest closing means, said control means including timing means activated by said sensing means for delaying the start of said chest closing means for a predetermined interval after the initial arrival of a buck at the pressing station.

10. In a machine for pressing shirts and similar articles having a pressing station: the combination of a frame, a buck movably mounted on said frame for movement into and out of said pressing station, a pair opposed pressing chests at said pressing station, means mounting said pressing chests for parallel movement into and out of engagement with opposite sides of said buck and for pivotal movement through a given range there beyond, toggle mechanisms between said pressing chests and said frame for moving the chests through said pivotal range of movement towards and away from said buck and eccentric means between the arms of said toggle mechanisms operable upon said toggle mechanisms reaching a fully open condition for moving said chests through their parallel movement range.

11. In a machine for pressing shirts and similar articles: the combination of a frame, a buck mounted on said frame at a pressing station, supporting levers for said chests each hinged at one end to said frame and at the other end to the respective chest to permit swinging movement of the chests relative to said frame and a pivotal movement of each chest relative to the respective supporting lever, outwardly extending arms on said chest, and cam means on said frame coacting with the outer ends of said arms for controlling the pivotal movement of the chests relative to said supporting levers to cause the chests to be moved in parallel to each other into and out of engagement with said buck and to be moved there beyond with a swinging movement relative to said frame.

12. In a shirt pressing machine having dressing and pressing stations: the combination of a frame, a buck movably mounted on said frame for movement between said stations, said buck having side wings spring urged into outward positions to place sidewise tension on the body of a shirt dressed on the buck, a pair of opposed pressing chests at said pressing station mounted for swinging movement through a first travel range from their open positions and for parallel movement through a final travel range into and out of engagement with said buck, reciprocable means for moving said chests between open and closed positions, and means activated by closing movement of said chest in said final travel range for exerting additional outward force on said side wings whereby to place increased sidewise tension on said shirt during the pressing thereof.

13. In a shirt pressing machine having dressing and pressing stations: The combination of a pair of bucks mounted for movement between said stations, means intercoupling said bucks to cause one to be moved to one of said stations as the other is moved to the other station, each of said bucks having a pair of sleeve extender arms, side wings and a tail clamp, spring means in said buck for biasing said side wings to expanded positions and said tail clamp to a closed position, a first double air cylinder in said buck for shifting said sleeve extender arms between expanded and retracted positions, a second double acting cylinder in said buck connected to said siode wings and operable in one direction to retract said side wings and in the other direction to exert a high tension expansion on said side wings, a third air cylinder in said buck for opening said tail clamp, each of said bucks having a first air inlet opening at the back end of its base structure for feeding air pressure to said air cylinders to retract said sleeve extender arms and said side wings and to open said tail clamp and having a second air inlet opening for feeding air pressure to said first cylinder to expand said sleeve extender arms, each of said bucks having also an air inlet opening at the forward end of its base structure for feeding air pressure to said second air cylinder to cause the same to exert a high expanding force on said side wings, first and second spring urged air snubbers at said dressing station for engaging said first and second air inlet openings at the back end of a buck as the buck is moved into the dressing station, and a third spring pressed air snubber at said pressing station for engaging the air inlet opening at the forward end of the buck as the buck is moved into said pressing station.

14. The shirt pressing machine as set forth in claim 13 including control means operable by a buck as the same is moved into said dressing station for feeding air pressure to said first air snubber, and control means at said dressing station operable while a buck is at said station to cut off air pressure from said first air snubber and to feed air pressure to said second air snubber.

15. The shirt pressing machine set forth in claim 14 including control means operable by a buck as the same is moved into said pressing station for feeding air to said third air snubber.

References Cited

UNITED STATES PATENTS

| | | | |
|---|---|---|---|
| 2,743,854 | 5/1956 | Strike | 223—57 |
| 3,070,268 | 12/1962 | Carpenter | 223—57 |
| 3,273,765 | 9/1966 | Piilola | 223—57 |
| 3,378,178 | 4/1968 | Stewart | 223—57 |
| 3,384,347 | 5/1968 | Lornitzo | 223—57 |

MERVIN STEIN, Primary Examiner

GEORGE V. LARKIN, Assistant Examiner